(12) United States Patent
Yoshitake et al.

(10) Patent No.: US 8,236,724 B2
(45) Date of Patent: Aug. 7, 2012

(54) CATALYST-SUPPORTING PARTICLE, COMPOSITE ELECTROLYTE, CATALYST ELECTRODE FOR FUEL CELL, AND FUEL CELL USING THE SAME, AND METHODS FOR FABRICATING THESE

(75) Inventors: Tsutomu Yoshitake, Tokyo (JP); Shin Nakamura, Tokyo (JP); Sadanori Kuroshima, Tokyo (JP); Hidekazu Kimura, Tokyo (JP); Hideto Imai, Tokyo (JP); Yuichi Shimakawa, Tokyo (JP); Takashi Manako, Tokyo (JP); Yoshimi Kubo, Tokyo (JP)

(73) Assignee: NEC Corporation, Tokyo (JP)

( * ) Notice: Subject to any disclaimer, the term of this patent is extended or adjusted under 35 U.S.C. 154(b) by 2151 days.

(21) Appl. No.: 10/515,918

(22) PCT Filed: May 28, 2003

(86) PCT No.: PCT/JP03/06644
§ 371 (c)(1),
(2), (4) Date: Nov. 29, 2004

(87) PCT Pub. No.: WO03/100890
PCT Pub. Date: Dec. 4, 2003

(65) Prior Publication Data
US 2006/0019146 A1    Jan. 26, 2006

(30) Foreign Application Priority Data
May 29, 2002 (JP) .................................. 2002-155231

(51) Int. Cl.
*B01J 21/18* (2006.01)
*B01J 23/00* (2006.01)
*B01J 23/40* (2006.01)
*B01J 23/74* (2006.01)
*B32B 5/16* (2006.01)
*B32B 9/00* (2006.01)
*B32B 15/02* (2006.01)
*B32B 17/02* (2006.01)
*B32B 19/00* (2006.01)
*B32B 21/02* (2006.01)
*B32B 23/02* (2006.01)
*B32B 27/02* (2006.01)

(52) U.S. Cl. .......................... 502/182; 502/185; 428/403
(58) Field of Classification Search .................. 502/182, 502/185; 428/403
See application file for complete search history.

(56) References Cited

U.S. PATENT DOCUMENTS
4,146,438 A * 3/1979 de Nora et al. ................. 205/43
4,399,167 A * 8/1983 Pipkin ........................... 427/217
(Continued)

FOREIGN PATENT DOCUMENTS
JP          05-174838    *  7/1993
(Continued)

*Primary Examiner* — Patricia L Hailey
(74) *Attorney, Agent, or Firm* — Sughrue Mion, PLLC

(57) ABSTRACT

An adhesive layer 3 is disposed between a carbon particle 2 and a catalyst substance 1 of a catalyst-supporting particle for a fuel cell containing the carbon particle 2 and the catalyst substance 1. Thereby, the catalyst-supporting particle for fuel cell can be obtained in which a contact resistance between the catalyst substance and the carbon particle supporting the same is lower, and the aggregation of the catalyst substance is suppressed. A catalyst electrode for a fuel cell and the fuel cell using the above particle have a higher output power and an excellent durability.

4 Claims, 3 Drawing Sheets

U.S. PATENT DOCUMENTS

| | | | |
|---|---|---|---|
| 4,636,485 A * | 1/1987 | van der Smissen | 502/182 |
| 4,703,028 A | 10/1987 | Steininger | |
| 5,391,524 A * | 2/1995 | Ledoux et al. | 501/91 |
| 6,211,113 B1 * | 4/2001 | Harth et al. | 502/200 |
| 6,297,185 B1 * | 10/2001 | Thompson et al. | 502/101 |
| 6,482,763 B2 * | 11/2002 | Haugen et al. | 502/101 |
| 6,670,300 B2 * | 12/2003 | Werpy et al. | 502/182 |
| 7,005,401 B2 * | 2/2006 | Lu et al. | 502/182 |

FOREIGN PATENT DOCUMENTS

| | | | |
|---|---|---|---|
| JP | 5-174838 A | | 7/1993 |
| JP | H05-174838 A | | 7/1993 |
| JP | H06-260170 A | | 9/1994 |
| JP | 08-203536 | * | 8/1996 |
| JP | 8-203536 A | | 8/1996 |
| JP | H08-203536 A | | 8/1996 |
| JP | H09-17435 A | | 1/1997 |
| JP | 10-162839 A | | 6/1998 |
| JP | H10-162839 A | | 6/1998 |
| JP | 2000-173624 A | | 6/2000 |
| JP | 2001-85020 A | | 3/2001 |
| JP | 2002-289208 A | | 10/2002 |

* cited by examiner

CATALYST-SUPPORTING PARTICLE, COMPOSITE ELECTROLYTE, CATALYST ELECTRODE FOR FUEL CELL, AND FUEL CELL USING THE SAME, AND METHODS FOR FABRICATING THESE

TECHNICAL FIELD

The present invention relates to a catalyst-supporting particle for a fuel cell, and a composite electrolyte, a catalyst electrode for a fuel cell and a fuel cell using the same, and methods for fabricating these.

BACKGROUND ART

A polymer electrolyte fuel cell is a power-generating apparatus by causing an electrochemical reaction while supplying hydrogen to a fuel electrode and oxygen to an oxidant electrode. The fuel electrode and the oxidant electrode are bonded to the respective surfaces of a solid polymer electrolyte membrane containing perfluorosulfonic acid acting as an electrolyte The following reactions take place in the respective electrodes.

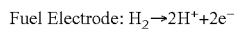

Fuel Electrode: $H_2 \rightarrow 2H^+ + 2e^-$

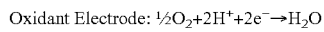

Oxidant Electrode: $\frac{1}{2}O_2 + 2H^+ + 2e^- \rightarrow H_2O$

A higher output power of 1 A/cm² or more can be obtained at ambient temperatures and atmospheric pressure in accordance with these reactions in the polymer electrolyte fuel cell.

In the fuel electrode and the oxidant electrode, there are provide mixtures consisting of carbon particles supporting a catalyst substance and a solid polymer electrolyte. Generally, these mixtures are applied on backing layers such as carbon paper acting as layers for diffusing fuel gas. These two electrodes sandwiching the polymer electrolyte membrane are thermally bonded under pressure to configure the fuel cell.

In the fuel cell thus configured, hydrogen gas supplied to the fuel electrode reaches to the catalyst after passing through fine pores in the electrode to be converted into hydrogen ions by releasing the electrons. The released electrons are guided to an external circuit after passing through the carbon particles and the solid polymer electrolyte in the fuel electrode and flow into the oxidant electrode through the external circuit.

On the other hand, the hydrogen ions generated on the fuel electrode reach to the oxidant electrode through the polymer electrolyte in the fuel electrode and the solid polymer electrolyte membrane sandwiched between both the electrodes, and then form water by means of the reaction with oxygen supplied to the oxidant electrode and the electrons flowing from the external circuit in accordance with the above reaction formula. As a result, the electrons flow in the external circuit from the fuel electrode toward the oxidant electrode to generate electric power.

In order to improve the characteristics of the fuel cell having the above configuration, a better adhesion is important at the interfaces between the electrodes and the polymer electrolyte membrane. That is, the higher electro-conductivity of the hydrogen ions generated through the electrode reaction is required at the interfaces between them. An inferior adhesion at the interface increases the electric resistance due to the decrease of the conductivity of the hydrogen ions to cause a reduction of the cell efficiency.

While the fuel cell using hydrogen as the fuel has been described heretofore, the research and the development regarding the fuel cell using an organic liquid fuel such as methanol have been extensively conducted in recent years.

In the meantime, the electrical losses generated in the cell are required to be low as much as possible for improving the output power characteristics of the fuel cell. The main electric losses include those due to resistance over voltage, activation over voltage and concentration over voltage, and the loss of fuel not reacted in the fuel electrode.

In order to decrease the activation over voltage among these, the use of a catalyst substance having a higher catalyst activity is important in the fuel electrode and the oxidant electrode.

In order to decrease the resistance over voltage, it is important to reduce the respective resistance losses as much as possible including the resistance of a polymer electrolyte membrane, the resistance of a catalyst electrode and a contact resistance.

The resistance over voltage due to the contact resistance includes the contact resistance between a catalyst and a carbon particle supporting the catalyst. Platinum or platinum-based alloy is used as the catalyst for the fuel cell. The platinum-based catalyst having a particle diameter about 2 to 10 nm is supported on the surfaces of the carbon particle by using a wet process such as impregnation. The platinum-based catalyst having a relatively lower bonding force with carbon is a substance which hardly forms a carbide. This is because the aggregation among the catalyst atoms on the carbon particle surface is energetically more stable than the bonding of the platinum-based catalyst with the carbon. Accordingly, when the platinum-based catalyst is supported on the carbon particle surface, the catalyst is generally adsorbed as spherical particles as shown in FIG. 1. The adsorption of the catalyst in the form of the spherical particles reduces the contact area between the catalyst particles and the carbon particles, thereby increasing the contact resistance between the catalyst particles and the carbon particles. That is, the diffusion resistance of electrons generated on the fuel electrode from the catalyst substance to the carbon particle is increased to limit the output power of the fuel cell.

When, as shown in FIG. 1, the catalyst substance is adsorbed in the form of the particles on the carbon particle surface due to the relatively weaker bonding between the catalyst and the carbon particle, this adsorption is responsible for the aggregation of the catalyst particles in addition to the increase of the contact resistance. That is, the catalyst aggregates on the carbon particle surface with the use thereof to increase the particle size when fuel cell is used in the state of power generation because the bonding energy between the platinum and the carbon is lower. Since the redox reaction of the fuel cell takes place on the catalyst surface, the larger catalyst particle reduces the specific surface area of the catalyst to increase the current density. Accordingly, the higher overvoltage due to the aggregation of the catalyst particles generates the output power reduction of the fuel cell.

As described above, it is required in the fuel cell that the contact resistance between the catalyst substance and the carbon particle is reduced, and the aggregation of the catalyst substance after a long period of continuous operation and the output power reduction accompanied thereby are suppressed.

In view of the foregoing circumstance, a technical problem of the present invention is to provide a catalyst-supporting carbon particle, a composite electrolyte and a catalyst electrode for a fuel cell in which the contact resistance between the catalyst substance and the carbon particle supporting the same is lower and the aggregation of the catalyst substance is suppressed, and is to provide a fuel cell having the higher output power and the excellent durability and a method for fabricating the same.

DISCLOSURE OF INVENTION

In accordance with the present invention, a catalyst-supporting particle for a fuel cell is provided which includes a carbon particle, catalyst metal supported on the carbon particle, and an adhesive layer disposed between the carbon particle and the catalyst metal.

In the catalyst-supporting particle for the fuel cell of the present invention, the adhesive layer disposed between the carbon particle and the catalyst metal has the affinity to both of the carbon particle and the catalyst metal. In this configuration, the contact area of the catalyst metal with the carbon particle surface having the adhesive layer on the surface can be increased.

In the catalyst-supporting particle for the fuel cell of the present invention, the adhesive layer can contain an element forming a carbide with a carbon atom.

The carbide is a compound formed by carbon and an element which is more positive than the carbon. For example, the carbon forms an interstitial-type carbide with a compound having an atomic radius larger than that of the carbon. The interstitial-type carbide is formed by entering the carbon into the interstitial site among metal atoms. When the atomic radius of the metal is $0.14 \times 10^{-10}$ m or more, the carbides of MC type (M=Ti, Zr, Hf, V, Nb, Ta, Mo) and of MC2 type (M=V, Ta, Mo, V) are formed. All of these are rigid, high in their melting points and chemically stable. The atomic radius of $0.14 \times 10^{-10}$ m or less provides the carbides of M3C or M3C2 type.

In this manner, the affinity between the adhesive layer and the carbon particle is increased to stably dispose the adhesive layer on the carbon particle surface.

The adhesive layer in the catalyst-supporting particle for the fuel cell of the present invention may be configured to contain one or more elements selected from Ti, Zr, Hf, V, Nb, Ta, Cr, Mo, W, Mn, Fe, Co and Ni. In this manner, the affinity between the element contained in the adhesive layer and the carbon particle can be further increased.

The adhesive layer in the catalyst-supporting particle for the fuel cell of the present invention may be configured to contain a transition metal element. The use of the transition metal having more proper affinity than the carbon particle can stably support the catalyst metal on the adhesive layer surface when the catalyst metal is a substance having higher stability as an elementary substance.

The adhesive layer in the catalyst-supporting particles for the fuel cell of the present invention may be configured to contain a group IV element in the long-period type periodic table. In this manner, the affinity with the carbon particle can be increased. Further, the affinity between the adhesive layer and the carbon particle can be increased.

The catalyst metal in the catalyst-supporting particle for the fuel cell of the present invention may be configured to contain platinum group metal or its alloy. Since the adhesive layer is disposed between the catalyst metal and the carbon particle in the catalyst-supporting particle for the fuel cell of the present invention, the catalyst metal can be stably supported on the carbon particle surface with a broader contact area through the adhesive layer even when the catalyst metal is a stable substance as an elementary substance such as the platinum group metal.

In accordance with the present invention, a composite electrolyte can be provided which contains the catalyst-supporting particles for the fuel cell and a solid polymer electrolyte.

The composite electrolyte of the present invention containing the catalyst-supporting particles for the fuel cell can be suitably used in the catalyst electrode of the fuel cell.

In accordance with the present invention, a catalyst electrode for a fuel cell is provided which includes a backing layer, and a catalyst layer containing catalyst-supporting carbon particles and a solid polymer electrolyte formed on the backing layer, wherein the catalyst-supporting carbon particles are the catalyst-supporting particles for the fuel cell as described above.

The catalyst electrode for the fuel cell of the present invention containing the catalyst-supporting particles for the fuel cell can be suitably used as the catalyst electrode of the fuel cell.

In accordance with the present invention, a fuel cell is provided which includes a fuel electrode, an oxidant electrode and a polymer electrolyte membrane sandwiched by the fuel electrode and the oxidant electrode characterized in that the fuel electrode or the oxidant electrode includes a backing layer and a catalyst layer formed on the backing layer and containing catalyst-supporting carbon particles and a solid polymer electrolyte, and the fuel electrode or the oxidant electrode contains, as the catalyst-supporting carbon particles, the above catalyst-supporting particles for the fuel cell.

The fuel cell of the present invention contains the catalyst-supporting particles in the catalyst layer of the catalyst electrode. Accordingly, the electric loss due to the contact resistance between the catalyst metal and the carbon particle can be reduced in the catalyst layers of the fuel electrode and the oxidant electrode of the fuel cell. Therefore, the higher output power can be obtained.

In accordance with the present invention, a method of preparing a catalyst-supporting particle for a fuel cell is provided which includes the steps of forming an adhesive layer for supporting catalyst metal on a carbon particle surface, and supporting the catalyst metal on the carbon particle surface.

The method of preparing the catalyst-supporting particle for the fuel cell of the present invention includes the step of forming the adhesive layer between the carbon particle and the catalyst metal. Accordingly, the catalyst metal supported on the carbon particle through the adhesive layer increases the contact area therebetween.

The method of preparing the catalyst-supporting particle for the fuel cell of the present invention can include the step of thermally treating the adhesive layer formed on the carbon particle at 100° C. or more between the step of forming the adhesive layer on the carbon particle surface and the step of supporting the catalyst metal on the carbon particle surface. In this manner, the metal contained in the adhesive layer is converted into the carbide. Accordingly, the affinity between the adhesive layer and the carbon particle can be further increased.

The method of preparing the catalyst-supporting particle for the fuel cell of the present invention can include the step of performing reduction in a hydrogen atmosphere after the step of supporting the catalyst metal on the carbon particle surface.

In the method of preparing the catalyst-supporting particle for the fuel cell of the present invention, the catalyst metal is supported on the adhesive layer surface as its oxide. The oxide is converted into its elementary substance by the reduction treatment of the oxide in the hydrogen atmosphere after the supporting. In this manner, the catalytic activity of the catalyst metal can be further enhanced.

In the method of preparing the catalyst-supporting particles for the fuel cell of the present invention, the adhesive layer can contain an element which can form a carbide with a carbon atom.

The carbide is a compound formed by carbon and an element which is more positive than the carbon. For example, the carbon forms an interstitial-type carbide with a compound having an atomic radius larger than that of the carbon. The interstitial-type carbide is formed by entering the carbon into the interstitial site among metal atoms. When the atomic radius of the metal is $0.14 \times 10^{-10}$ m or more, the carbides of MC type (M=Ti, Zr, Hf, V, Nb, Ta, Mo) and of MC2 type (M=V, Ta, Mo, V) are formed. All of these are hard, high in their melting points and chemically stable. The atomic radius of $0.14 \times 10^{-10}$ m or less provides the carbides of M3C or M3C2 type.

In this manner, the affinity between the adhesive layer and the carbon particle is increased to stably dispose the adhesive layer on the carbon particle surface.

In the method of preparing the catalyst-supporting particle for the fuel cell of the present invention, the adhesive layer may be configured to contain one or more elements selected from Ti, Zr, Hf, V, Nb, Ta, Cr, Mo, W, Mn, Fe, Co and Ni. In this manner, the affinity between the element contained in the adhesive layer and the carbon particle can be further increased.

In the method of preparing the catalyst-supporting particle for the fuel cell of the present invention, the adhesive layer may be configured to contain a transition metal element. The use of the transition metal having more proper affinity than the carbon particle can stably support the catalyst metal on the adhesive layer surface when the catalyst metal is a substance having higher stability as an elementary substance.

In the method of preparing the catalyst-supporting particle for the fuel cell of the present invention, the adhesive layer may be configured to contain a group IV element in the long-period type periodic table. In this manner, the affinity between the adhesive layer and the carbon particles can be increased.

In the method of preparing the catalyst-supporting particle for the fuel cell of the present invention, the catalyst metal may be configured to contain platinum group metal or its alloy. Since the adhesive layer is disposed between the catalyst metal and the carbon particle in the method of preparing the catalyst-supporting particle for the fuel cell of the present invention, the catalyst metal can be stably supported on the carbon particle surface with a broader contact area through the adhesive layer even when the catalyst metal is a stable substance as an elementary substance such as the platinum group metal.

In accordance with the present invention, a method of fabricating a fuel cell is provided which includes the steps of preparing the catalyst electrode for the fuel cell in accordance with the above method of preparing the catalyst electrode for the fuel cell, and bonding a polymer electrolyte membrane and the catalyst electrode for the fuel cell under pressure under a state in which the polymer electrolyte membrane and the catalyst electrode for the fuel cell are in contact with each other.

The method of fabricating the fuel cell of the present invention includes the step of supporting the catalyst-supporting particles for the fuel cell on the catalyst layer of the catalyst electrode. Accordingly, the electric loss due to the contact resistance between the catalyst metal and the carbon particle can be reduced in the catalyst layers of the fuel electrode and the oxidant electrode of the fuel cell. Therefore, the higher output power can be obtained. Further, the aggregation of the catalyst metal after a long period of continuous operation can be suppressed and the output power reduction can be suppressed.

In this manner, the present invention provides the catalyst-supporting particle for the fuel cell, the composite electrolyte and the catalyst electrode, by disposing the adhesive layer between the carbon particle and the catalyst substance, in which the contact resistance between the catalyst substance and the carbon particle supporting the same is smaller, and the aggregation of the catalyst substance is suppressed. Further, the fuel cell having the higher output power and the excellent durability, and the method of fabricating the same are realized.

The above and other objects, features and advantages of the present invention will be more apparent from the following description.

BEST MODE FOR IMPLEMENTING INVENTION

A catalyst-supporting particle for a fuel cell of the present invention include an adhesive layer between a carbon particle and a catalyst substance supported on the carbon particle surface.

Figure 1:
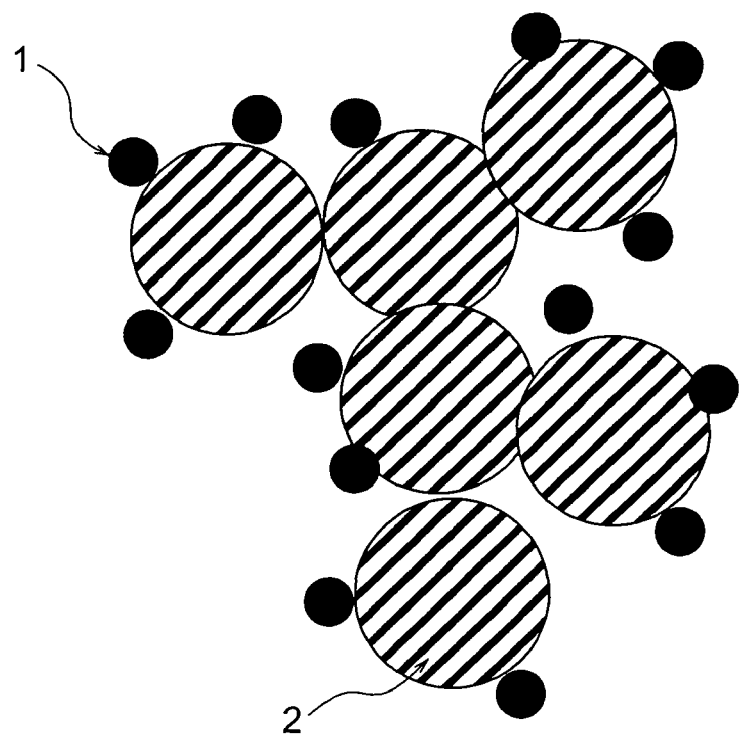
FIG. 1 is a schematic view showing a conventional structure in which a catalytic substance is supported on a carbon fine particle surface.
Figure 2:
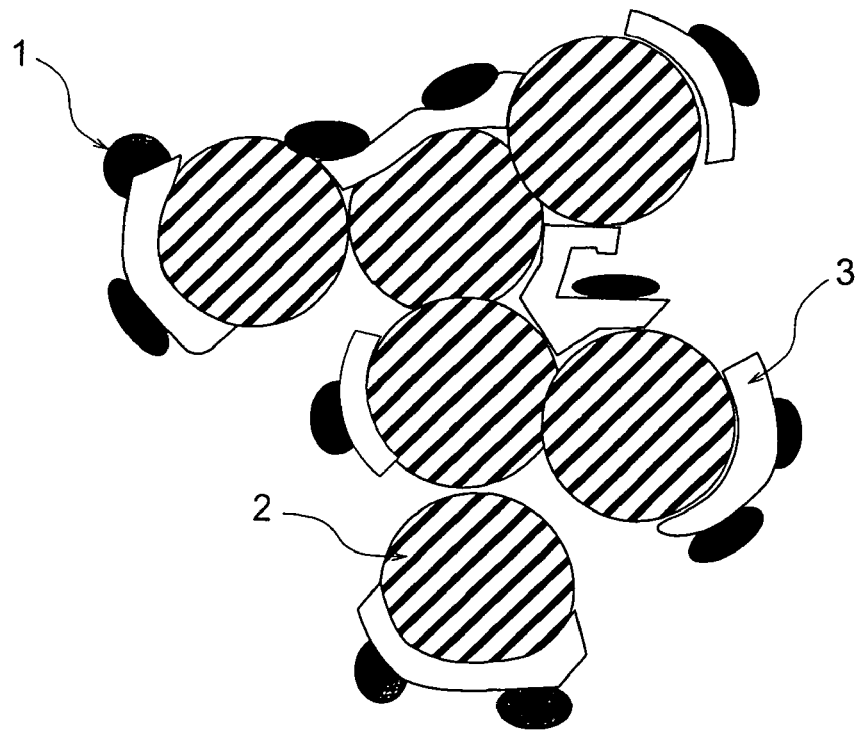
FIG. 2 is a schematic view showing a structure in which a catalytic substance is supported on a carbon fine particle surface in accordance with the present invention.

As shown in FIG. 2, the adhesive layer 3 is disposed between the catalyst substance 1 and the carbon particle 2 in a catalyst layer used in a fuel cell of the present invention. The adhesive layer 3 containing a substance having suitably higher affinity to the carbon particle 2 and the catalyst substance 1 acts as a binder having electro-conductivity. Thickness of the adhesive layer 3 is 10 nm or less, for example. Preferably, the thickness of the adhesive layer 3 is smaller than the average particle thickness of the catalyst substance 1, that is, 3 nm or less, for example. In this manner, the catalyst substance 1 is more suitably supported on the carbon particle 2 through the adhesive layer 3.

For example, a transition metal or its alloy can be used as the adhesive layer 3. In view of the affinity with the catalyst substance 1, the transition metal or its alloy has more suitable affinity to the catalyst substance such as platinum having the higher stability as an elementary substance than the carbon particles has.

The adhesive layer 3 may contain, for example, one or more elements selected from Ti, Zr, Hf, V, Nb, Ta, Cr, Mo, W, Mn, Fe, Co and Ni. These elements are considered to have the suitable affinity with the carbon particles 2.

The affinity of the adhesive layer 3 to the carbon particle 2 can be increased by forming more stable carbide layer at the interface between the adhesive layer 3 and the carbon particle 2. These elements converted into the carbides are considered to increase the affinity with the carbon particle 2.

When the carbides of the above elements are used as the adhesive layer 3, the selection among Ti, Zr, Hf, V, Nb and Ta is preferable because the electric resistances of their carbides are relatively small.

The factors affecting the affinity between the adhesive layer 3 and the carbon particle 2 are considered to include a difference between atomic sizes, a crystal structure, a valency and electronegativity based on an empirical rule regarding solid-solubility of binary solids. Accordingly, a group IV element in the long-period type periodic table can be selected as the adhesive layer 3. Among the group IV elements, Ti is preferable because Ti has an atomic radius closest to that of carbon and most easily forms the carbide. Further, Ti exhibiting the suitable affinity with platinum is preferable when the catalyst substance 1 contains the platinum or its alloy.

As described above, the catalyst substance 1 can be strongly supported on the carbon particle 1 through the adhesive layer 3 by means of the affinity between the adhesive layer 3 and the catalyst substance 1 and the affinity between the adhesive layer 3 and the carbon particle 2 by using the adhesive layer 3 containing the substance with the affinities to both of the catalyst substance 1 and the carbon particle 2.

The proper selection of the material of the adhesive layer 3 increases the affinity between the adhesive layer 3 and the catalyst substance 1 and the affinity between the adhesive layer 3 and the carbon particle 2. In this manner, the contact area between the adhesive layer 3 and the catalyst substance 1 is increased such that the structure having the lower contact resistance at the interface can be provided. For example, the catalyst substance 1 can be adsorbed on the adhesive layer 3 disposed on the carbon particle 2 surface not in the form of particulate but in the form of a plate or a layer.

Therefore, the use of the catalyst-supporting particles for the fuel cell of the present invention in the catalyst electrode for the fuel cell and the fuel cell can reduce the electric loss due to the contact resistance between the catalyst substance 1 and the carbon particle 2 in the catalyst layers constituting the fuel electrode and the oxidant electrode of the fuel cell, thereby increasing the output power of the fuel cell.

In the configuration of FIG. 2 of the present invention, the adhesive layer 3 between the catalyst substance 1 and the carbon particle 2 acting as the adhesive layer also has roles of fixing the catalyst substance on the carbon particle surface and of not allowing the easy diffusion. Accordingly, even after a longer period of operation as the catalyst electrode for the fuel cell, the aggregation of the catalyst substance 1 heretofore observed can be suppressed. Accordingly, the adhesive layer 3 makes stable the change on time of the fuel cell output power.

The fuel cell of the present invention includes the fuel electrode, the oxidant electrode and a solid electrolyte membrane. The catalyst electrode refers to both of the fuel electrode and the oxidant electrode.

Figure 3:
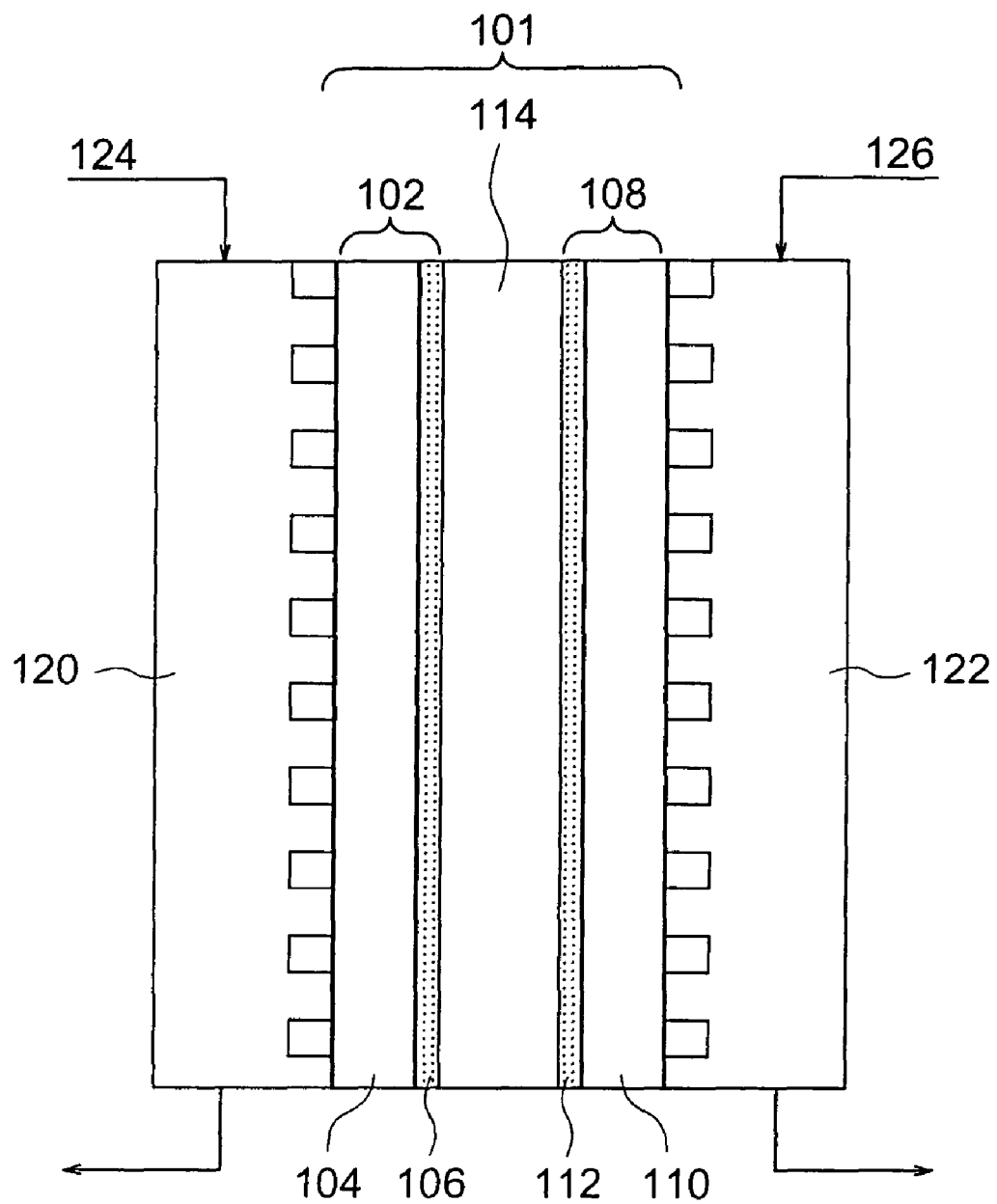
FIG. 3 is a sectional view schematically showing one example of a fuel cell of the present invention.

FIG. 3 is a sectional view schematically showing a single cell structure of a fuel cell in an embodiment. A fuel cell 100 includes a plurality of single cell structures 101. Each of the single cell structures 101 is composed of a fuel electrode 102, an oxidant electrode 108 and a polymer electrolyte membrane 114. Fuel 124 is supplied to the fuel electrode 102 of each of the single cell structures 101 through a fuel electrode-side separator 120. Oxidant 126 is supplied to the oxidant electrode 108 of each of the single cell structures 101 through an oxidant electrode-side separator 122.

Figure 4:
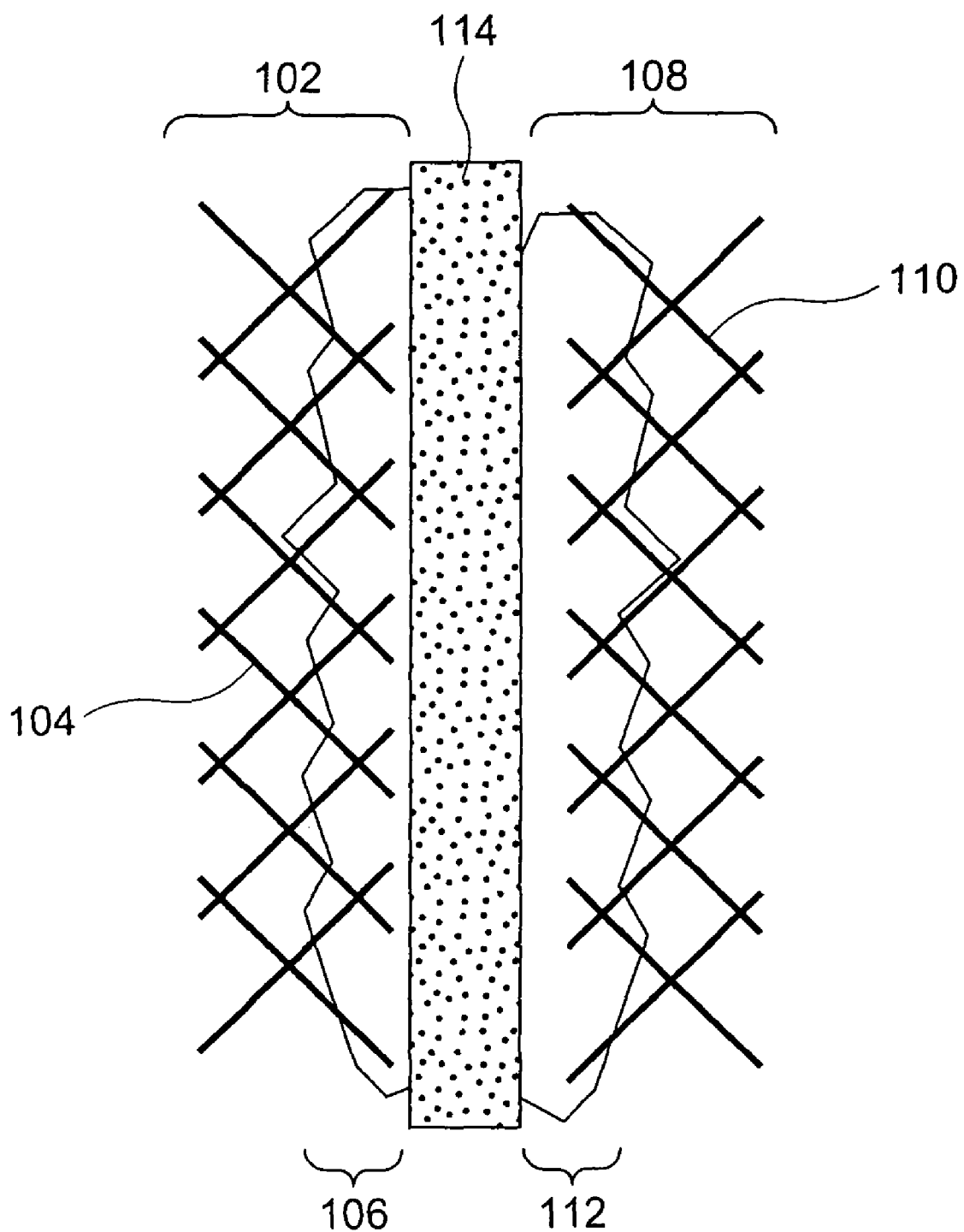
FIG. 4 is a sectional view schematically showing a fuel electrode, an oxidant electrode and a polymer electrolyte membrane in the example of the fuel cell of the present invention.

FIG. 4 is a sectional view schematically showing the structure of the fuel electrode 102, the oxidant electrode 108 and the polymer electrolyte membrane 114. As shown in FIGS. 3 and 4, the fuel electrode 102 and the oxidant electrode 108 of the present embodiment have the configurations that the catalyst layer 106 and the catalyst layer 112 are formed on the backing layer 104 and the backing layer 110. The catalyst layer 106 and the catalyst layer 112 can contain, for example, the catalyst-supporting particles and the fine particles of the solid polymer electrolyte, and have a metal layer which easily forms the carbide with the catalyst metal supported on the carbon particle surface. The substrate surface may be treated in a water-repellent manner.

A porous substrate made of carbon paper, a molded carbon article, a sintered carbon article, sintered metal and foamed metal can be used as the backing layer 104 and the backing layer 110.

As the catalyst of the fuel electrode 102, platinum, rhodium, palladium, iridium, osmium, ruthenium, rhenium, gold, silver, nickel, cobalt, lithium, lanthanum, strontium and yttrium can be exemplified, and these can be used singly or in combinations of two or more elements. On the other hand, the catalyst of the fuel electrode 102 can be also used as the catalyst of the oxidant electrode 108, and the same catalysts can be exemplified. The catalysts of the fuel electrode 102 and the oxidant electrode 108 may be the same or different from each other.

As the carbon particle for supporting the catalyst, acetylene black (Denka Black (registered trademark, available from Denki Kagaku Kogyo K.K.), XC72 (available from Vulcan Corporation), ketjen black, amorphous carbon, carbon nanotube and carbon nanohorn can be exemplified. The particle size of the carbon particle is, for example, 0.001 μm or more to 0.1 μm or less, and preferably 0.02 μm or more to 0.06 μm or less.

The solid polymer electrolyte which is the constituent of the catalyst electrode of the present invention has a role of electrically connecting the carbon particle supporting the catalyst with the polymer electrolyte membrane 114 on the catalyst electrode surface together with allowing the organic liquid fuel to reach the catalyst surface. The solid polymer electrolyte is required to have the hydrogen ion conductivity and the water mobility, further to have the permeability regarding the organic liquid fuel such as methanol in the fuel cell 102, and to have the oxygen permeability on the oxidant electrode 108. In order to satisfy these requirements, the material excellent in the hydrogen ion conductivity and the permeability regarding the organic liquid fuel such as methanol is preferably used as the solid polymer electrolyte. Specifically, organic polymers having a polar group including a strongly acidic group such as sulfone group and phosphate group and a weakly acidic group such as carboxyl group are preferably used. As the organic polymers, sulfone group-containing perfluorocarbon (Nafion (available from Du Pont), Aciplex available from Asahi Kasei Corporation)); carboxyl group-containing perfluorocarbon (Flemion S membrane (available from Asahi Glass Co., Ltd.)); copolymers such as polystyrenesulfonic acid copolymer, polyvinylsulfonic acid copolymer, bridged alkylsulfonic acid derivative; and fluorine-containing polymer made of fluorine resin skeleton and sulfonic acid; copolymers prepared by co-polymerizing acryl amide such as acryl amide-2-methylpropane sulfonic acid and acrylate such as n-butylmethacrylate can be exemplified.

As the polymers to which the polar group is bonded, resin having nitrogen or a hydroxyl group such as polybenzimidazole derivative, polybenzoxazole derivative, polyethyleneimine derivative, polycylamine derivative, amine-substituted polystyrene such as polydiethyl-aminoethylpolystyrene, and nitrogen-substituted polyacrylate such as diethylaminoethylpolymethacrylate; hydroxyl group-containing polyacryl resin represented by silanol-containing polysiloxane and hydroxyethylpolymethyl-acrylate; and hydroxyl group-containing polystyrene resin represented by parahydroxypolystyrene can be exemplified.

A crosslink substituent such as vinyl group, epoxy group, acryl group, methacryl group, cinnamoyl group, methylol group, azide group and naphthoquinone-diazide group can be suitably introduced into the above polymers.

The above solid polymer electrolytes of the fuel electrode 102 and the oxidant electrode 108 may be the same or different from each other.

The polymer electrolyte membrane 114 has roles of separating the fuel electrode 102 from the oxidant electrode 108 and of moving a hydrogen ion between the both. Therefore, the polymer electrolyte membrane 114 is preferably the membrane having high hydrogen ion conductivity, and preferably has the chemical stability and the high mechanical strength.

As the material configuring the polymer electrolyte membrane 114, organic polymers are preferably used containing a strongly acidic group such as sulfone group, phosphate group, phosphone group and phosphine group and a weakly acidic group such as carboxyl group. As the above organic polymers, aromatic ring-containing polymers such as sulfonated poly(4-phenoxybenzoyl-1,4-phenylene) and alkylsulfonated polybenzoimidazole; copolymers such as polystyrenesulfonic acid copolymer, polyvinylsulfonic acid copolymer, bridged alkylsulfonic acid derivative and fluorine-containing polymer made of fluorine resin skeleton and sulfonic acid; copolymers prepared by co-polymerizing acryl amide such as acryl amide-2-methylpropane sulfonic acid and acrylate such as n-butylmethacrylate; sulfone group-containing perfluorocarbon (Nafion (available from Du Pont, registered trademark), Aciplex (available from Asahi Kasei Corporation, registered trademark); carboxyl group-containing perfluorocarbon (Flemion S membrane (available from Asahi Glass Co., Ltd.)) can be exemplified. When the aromatic ring-containing polymers such as the sulfonated poly(4-phenoxybenzoyl-1,4-phenylene) and the alkylsulfonated polybenzoimidazole are selected among these, the permeation of the organic liquid fuel can be suppressed to prevent the reduction of the cell efficiency due to crossover.

The polymer electrolyte membrane 114 of the fuel cell of the present invention has roles of separating the fuel electrode 102 from the oxidant electrode 108 and of moving a hydrogen ion and a water molecule between the both. Therefore, the polymer electrolyte membrane 114 is preferably the membrane having high hydrogen ion conductivity, and preferably has the chemical stability and the high mechanical strength. As the material configuring the polymer electrolyte membrane 114, organic polymers are preferably used including a strongly acidic group such as sulfone group, phosphate group, phosphone group and phosphine group and a weakly acidic group such as carboxyl group. As the above organic polymers, aromatic ring-containing polymers such as sulfonated poly(4-phenoxybenzoyl-1,4-phenylene) and alkylsulfonated polybenzoimidazole; copolymers such as polystyrenesulfonic acid copolymer, polyvinylsulfonic acid copolymer, bridged alkylsulfonic acid derivative and fluorine-containing polymer made of fluorine resin skeleton and sulfonic acid; copolymers prepared by co-polymerizing acryl amide such as acryl amide-2-methylpropane sulfonic acid and acrylate such as n-butylmethacrylate; sulfone group-containing perfluorocarbon (Nafion (available from Du Pont, registered trademark), Aciplex (available from Asahi Kasei Corporation, registered trademark); carboxyl group-containing perfluorocarbon (Flemion S membrane (available from Asahi Glass Co., Ltd.)) can be exemplified. The aromatic ring-containing polymers such as the sulfonated poly(4-phenoxybenzoyl-1,4-phenylene) and the alkylsulfonated polybenzoimidazole are selected among these, the permeation of the organic liquid fuel can be suppressed to prevent the reduction of the cell efficiency due to crossover.

Hydrogen can be used as the fuel in the fuel cell of the present invention, for example. Reformed hydrogen from natural gas or naphtha can be used as the fuel. Liquid fuel such as methanol can be directly supplied. Oxygen or air can be used as the oxidant.

Then, the method of preparing the catalyst-supporting carbon particle of the present invention will be described.

The metal layer is formed on the surface of the carbon particle acting as the carrier of the catalyst substance, and the catalyst substance is supported thereon.

Chloride, fluoride, iodide or sulfide of metal, or metal alcoxide such as metal propoxide can be used. The above compound is dissolved into pure water to provide an aqueous solution. The aqueous solution is cooled with ice water, and the carbon particles are added for agitation to adsorb the metal compound on the carbon particle surface. After the carbon particles with the adsorbed metal compound are filtered, they are placed in an atmosphere of inert gas such as argon and helium to be heated to, for example, 500° C. to 550° C. to form the metal layer on the carbon particle surface.

The formation of the metal layer on the carbon particle surface makes the strong bond at the interface between the metal layer and the carbon particle, and, as shown in FIG. 2, the metal layer generates the structure on the carbon particle surface not in the form of particulate but in the form of a coherent plate or a coherent layer, that is, the structure having the higher affinity at the interface.

After the formation of the metal layer on the carbon particle, a more stable carbide layer can be formed at the interface between the catalyst metal and the carbon particle by thermally treating the carbon particle in vacuum or in an atmosphere of inert gas such as argon at a temperature of 100° C. or more. The thermal treatment in vacuum can be conducted at 1 Pa or less, for example.

Then, the catalyst substance composed of platinum or platinum alloy is supported on the carbon particle surface. The supporting of the catalyst substance can be performed by the conventionally employed impregnation method. The catalyst substance is supported and appressed on the metal layer in the form of a layer or a plate. As a result, the contact area at the interface between the catalyst metal and the carbon particle increases to reduce the contact resistance at the interface.

While methods of fabricating the catalyst electrode for the fuel cell and the fuel cell are not especially restricted, they can be fabricated as follows, for example.

After the carbon particles supporting the catalyst through the adhesive layer prepared in the above manner and solid polymer electrolyte particles are dispersed in a solvent to make paste, the paste is applied on the backing layer and dried to provide the fuel electrode and the oxidant electrode. The particle size of the carbon particle is, for example, 0.01 μm or more and 0.1 μm or less. The particle size of the catalyst particle is, for example, 1 nm or more and 10 nm or less. The particle size of the solid polymer electrolyte particle is, for example, 0.05 μm or more and 1 μm or less. The carbon particle and the solid polymer electrolyte particle are used, for example, in a range between 2:1 and 40:1 in weight. The weight ratio between the water and the solute in the paste is, for example, from about 1:2 to 10:1.

While a method of applying the paste on the backing layer is not especially restricted, brush application, spray application or screen printing can be used, for example. The paste is applied at the thickness, for example, of about 1 μm or more and 2 mm or less. After the application of the paste, the backing layer is heated at specified temperatures and a specified length of time depending on the fluorine resin used to provide the fuel electrode and the oxidant electrode. While the heating temperatures and the heating period of time are appropriately determined depending on the material used, the heating temperatures may be 100° C. or more and 250° C. or less, and the heating period of time is 30 seconds or more and 30 minutes or less.

The solid electrolyte membrane of the present invention can be prepared by using an appropriated method depending on the material used. When the solid electrolyte membrane is made of an organic polymer material, for example, the liquid prepared by dissolving or dispersing the organic polymer material into a solvent is cast on an exfoliative sheet made of polytetrafluoroethlylene and dried to provide the solid electrolyte membrane.

The thus obtained polymer electrolyte membrane sandwiched between the fuel electrode and the oxidant electrode is hot-pressed to provide a membrane electrode assembly. At this stage, the surfaces on which the catalyst is supported of the both electrodes and the solid electrolyte membrane are in contact with each other. The conditions of the hot-pressing depend on the material used. When the solid electrolyte membrane and the solid polymer electrolyte on the electrode surface are made of organic polymers having softening points or glass transition points, the temperatures of the hot-pressing may be over the softening points or the glass transition points of the polymers. Specifically, the temperatures is 100° C. or more and 250° C. or less, the pressure is 1 kg/cm$^2$ or more and 100 kg/cm$^2$ or less and the heating period of time is 10 seconds or more and 300 seconds or less.

In accordance with the above, the fuel cell using, as the catalyst electrode, the catalyst-supporting carbon particle having the adhesive layer on the surface of the carbon particle can be obtained. The above fuel cell has the cell characteristics excellent in the durability for the use of a longer period of time at the higher output power because the adhesive layer disposed on the carbon particle surface increases the contact area of the catalyst substance and suppresses the aggregation among the catalyst substances.

EXAMPLES

Although the fuel cell, the electrode for the fuel cell and the methods for fabricating the same in accordance with the present invention will be hereinafter described more specifically by showing Examples, the present invention is not restricted thereto.

Example 1

The preparation and the evaluation of catalyst-supporting particle having a carbon particle, a catalyst substance and an adhesive layer sandwiched between the carbon particle and the catalyst substance were conducted in accordance with the following methods.

Ketjen black (available from Lion Corporation) was used as the carbon particle for supporting the catalyst. An aqueous solution was prepared by dissolving 1 g of titanium tetrachloride into 1 liter of pure water. After the aqueous solution was cooled with ice water and 10 g of the ketjen black was added and agitated, the titanium was adsorbed on the ketjen black surface. After the filtrations of the carbon particles supporting the titanium and the washings were repeated several times, a metal titanium layer was formed on the carbon particle surface by placing the particles in an argon atmosphere and heating to 500° C. The observation of the carbon particles at this stage with a transmission electron microscope (TEM) confirmed the formation of a thin titanium layer on the carbon particle surface. The thickness of the titanium layer was about 2 nm.

Then, 8 g of the carbon particles obtained above was mixed with 140 g of nitric acid solution of dinitrodiamine platinum containing 3% in weight of platinum acting as a catalyst substance followed by agitation. To this, 200 g of 98 v/v % of ethanol acting as a reducing agent was added. The dispersion liquid was agitated and mixed at about 95° C., which was a boiling point of the dispersion medium, at 50 rpm. for 8 hours to support the platinum acting as the catalyst on the titanium layer on the surface of the ketjen black particles. After the filtration and the drying of the dispersion liquid, the catalyst-supporting carbon particles were obtained by reduction treatment at 300° C. in a hydrogen gas atmosphere.

An amount of the platinum supported on the catalyst-supporting carbon particle obtained was about 50% with respect to the weight of the ketjen black.

For comparison, a specimen was prepared by directly supporting platinum as a catalyst substance on the surface of ketjen black which had no titanium layer by using the impregnation method. The weight ratio between the platinum and the ketjen black was 1:2.

The structures of these two catalyst-supporting carbon particles were observed with the TEM. When the platinum was directly supported on the ketjen black surface, the platinum was supported as spherical particles having a diameter of about 3 nm. On the other hand, in case of the ketjen black having the titanium layer, it was conformed that the platinum was preferentially formed on the titanium layer surface in the form of a flat plate or an oval such that the contact area with the titanium layer was increased. The platinum had the dimension of about 5 nm in diameter and about 2 nm in thickness.

After the thermal treatment of the catalyst-supporting carbon particles in hydrogen gas at 550° C. for 60 minutes, the aggregation of the platinum on the carbon particle surface was observed such that the average particle size of the platinum was increased to about 50 nm in case of the direct supporting of the platinum on the ketjen black surface. On the other hand, the platinum particle size was scarcely changed after the reduction treatment in case of the platinum supporting on the titanium layer surface.

The reason why the platinum particle size had not changed seemed that the platinum was strongly supported on the carbon particle on the carbon particle surface by using the titanium layer as the adhesive layer because the titanium layer was strongly adsorbed on the carbon particle surface and the platinum and the titanium layer were bonded relatively strongly.

The present Example confirmed that the catalyst-supporting carbon particle was obtained in which the platinum catalyst and the carbon particle were excellently adhered through the titanium layer and the aggregation of the platinum catalyst hardly took place, by forming the titanium layer as the adhesive layer and supporting the platinum catalyst thereon.

Example 2

The preparation and the evaluation of catalyst-supporting particle having a carbon particle, a catalyst substance and an adhesive layer sandwiched between the carbon particle and the catalyst substance were conducted in accordance with the following methods.

Acetylene black (available from Denki Kagaku Kogyo K.K.) was used as the carbon particle for supporting the catalyst. An aqueous solution was prepared by dissolving 1 g of zirconium tetrachloride into 1 liter of pure water. After the aqueous solution was cooled with ice water and 10 g of the acetylene black was added and agitated, the zirconium was adsorbed on the acetylene black surface. After the filtrations of the carbon particles supporting the zirconium and the washings were repeated several times, a metal zirconium layer was formed on the carbon particle surface by placing the particles in a helium atmosphere and heating to 500° C. The observation of the carbon particles at this stage with the TEM confirmed the formation of a thin zirconium layer on the carbon particle surface. The thickness of the metal layer was about 2 nm.

Then, the carbon particle obtained was thermally treated at 700° C., at $10^{-5}$ Pa and for one hour. As a result, the zirconium was converted into its carbide. The TEM observation revealed that the zirconium carbide layer having the thickness of about 3 nm was formed on the carbon particle surface.

Then, 8 g of the carbon particle obtained above was mixed with 140 g of nitric acid solution of dinitrodiamine platinum containing 3% in weight of platinum acting as a catalyst substance followed by agitation. To this, 200 g of 98 v/v % of ethanol acting as a reducing agent was added. The dispersion liquid was agitated and mixed at about 95° C., which was a boiling point of the dispersion medium, at 50 rpm. for 8 hours to support the platinum on the metal layer on the acetylene black particle surface. After the filtration and the drying of the dispersion liquid, the catalyst-supporting carbon particle was obtained by reduction treatment at 350° C. in a hydrogen gas atmosphere.

An amount of the platinum supported on the catalyst-supporting carbon particle obtained was about 50% with respect to the weight of the acetylene black.

The TEM observation of the structure of the catalyst-supporting carbon particle obtained revealed that the platinum was preferentially formed on the zirconium carbide layer surface in the form of a flat plate or an oval such that the contact area with the zirconium carbide layer was increased. The platinum had the dimension of about 5 nm in diameter and about 2 nm in thickness.

The TEM observation after the catalyst-supporting carbon particle was thermally treated in argon gas at 700° C. for two hours revealed that the platinum particle size was scarcely changed after the thermal treatment. The zirconium carbide layer seemed to act as strong glue with the carbon particle to provide the structure in which the aggregation of the platinum on the carbon particle was suppressed.

The present Example revealed that the catalyst-supporting carbon particle was obtained in which the platinum catalyst and the carbon particle were excellently adhered through the zirconium carbide layer and the aggregation of the platinum catalyst hardly took place, by forming the zirconium carbide layer as the adhesive layer on the carbon particle surface.

Example 3

Catalyst electrodes and fuel cells were fabricated by using the two kinds of the catalyst-supporting carbon particles prepared in Example 1 and the catalyst-supporting carbon particle prepared in Example 2.

A colloidal dispersion liquid of a polymer electrolyte was prepared by mixing a solid polymer electrolyte which was an alcohol solution containing 5% Nafion available from Aldrich Chemical Co. with n-butyl acetate such that an amount of the solid polymer electrolyte was adjusted to be 0.1 to 0.4 mg/cm$^2$, followed by agitation. Then, each 500 g of the above three kinds of the carbon particles supporting the platinum catalysts was added to 80 ml of the colloidal dispersion liquids of the polymer electrolytes prepared above to adsorb the colloids on the carbon particle surfaces. These dispersion liquids were made to be pastes by using a supersonic wave dispersion apparatus.

After the obtained pastes were applied on carbon papers (available from Toray Industries, Inc.) acting as diffusion layers at 2 mg/cm$^2$ by using the screen printing method, the carbon papers were heated and dried at 120° C. for 10 minutes to fabricate catalyst electrodes for fuel cells.

These electrodes were hot-pressed at a temperature of 100 to 180° C. and a pressure of 10 to 100 kg/cm$^2$ onto both surfaces of polymer electrolyte membranes "Nafion 112" (available Du Pont, registered trademark) to fabricate membrane electrode assemblies. The assemblies were placed on packages for measuring single cells of fuel cells to fabricate fuel cells.

The current-voltage characteristics of the obtained fuel cells were measured. Oxygen gas and hydrogen gas (1 atm. and 80° C.) were used as supply gas. Flow rates of the oxygen gas and the hydrogen gas were 100 cc/minute and 100 cc/minute, respectively.

As a result, a cell voltage at a current density of 600 mA/cm$^2$ of the specimen directly supporting the platinum catalyst on the ketjen black surface without an adhesive layer was 550 mV. On the other hand, when the specimen supporting the platinum catalyst on the ketjen black surface having the titanium layer was used, the current-voltage characteristic having the lower internal resistance than the above was exhibited, and a cell voltage was 600 mV. When the electrode supporting the platinum catalyst on the acetylene black having the zirconium carbide layer was used, an output voltage of 620 mV was obtained.

The results of the present Example revealed that the output of the fuel cell could be elevated by forming the metal layer or the metal carbide layer as the adhesive layer on the carbon particle surface and supporting the platinum catalyst thereon.

Example 4

Continuous loading operations for a longer period of time were conducted on the three fuel cells fabricated in Example 3.

Oxygen gas and hydrogen gas (1 atm. and 80° C.) were used as supply gas. Flow rates of the oxygen gas and the hydrogen gas were 100 cc/minute and 100 cc/minute, respectively.

A current density was 600 mA/cm$^2$.

As a result, an output voltage after a lapse of 500 hours was gradually decreased and the output voltage after the lapse of 5000 hours was decreased to about half of the initial output voltage in the fuel cell using the specimen directly supporting the platinum catalyst on the ketjen black surface without the adhesive layer.

On the other hand, the output voltages of 500 mV and 600 mV close to the initial voltage could be maintained after the lapse of 5000 hours in the fuel cell using the electrode supporting the platinum catalyst on the ketjen black having the titanium layer and in the fuel cell using the electrode supporting the platinum catalyst on the acetylene black having the zirconium carbide layer, respectively.

The present Example enabled the performances of the fuel cell to be maintained for a longer period of time by forming the metal layer or the metal carbide layer as the adhesive layer on the carbon particle surface and supporting the platinum catalyst thereon.

The above Examples revealed that the contact area of the supported catalyst substance was increased and the aggregation among the catalyst substances could be suppressed by forming the metal layer on the carbon particle surface in the preparation of the catalyst-supporting carbon particle. It was confirmed that by using the above carbon particle in the catalyst electrode for the fuel cell, the output power of the fuel cell could be increased and the reduction of the output power after the use of a longer period of time could be suppressed.

The invention claimed is:

1. A catalyst-supporting particle for a fuel cell comprising a carbon particle, catalyst metal supported on the carbon particle, and an adhesive layer disposed between the carbon particle and the catalyst metal,
   wherein the adhesive layer consists of one or more elements selected from the group consisting of Ti, Zr, Hf, V, Nb, Ta, Cr, Mo, W, Mn, Fe, Co and Ni and the adhesive layer forms a carbide with the carbon particle; and
   wherein the catalyst metal contains platinum group metal or its alloy.

2. The catalyst-supporting particle for the fuel cell as defined in claim 1, wherein the adhesive layer consists of one or more elements selected from the group consisting of Ti, Zr and Hf.

3. The catalyst-supporting particle for the fuel cell as defined in claim 1, wherein the adhesive layer consists of one or more elements selected from the group consisting of Mn, Fe, Co, Ni.

4. The catalyst-supporting particle for the fuel cell as defined in claim 1, wherein the adhesive layer contains a transition metal element.

* * * * *